March 12, 1957  A. B. LAKEY  2,785,022
SPHERICAL BEARING
Filed April 22, 1954
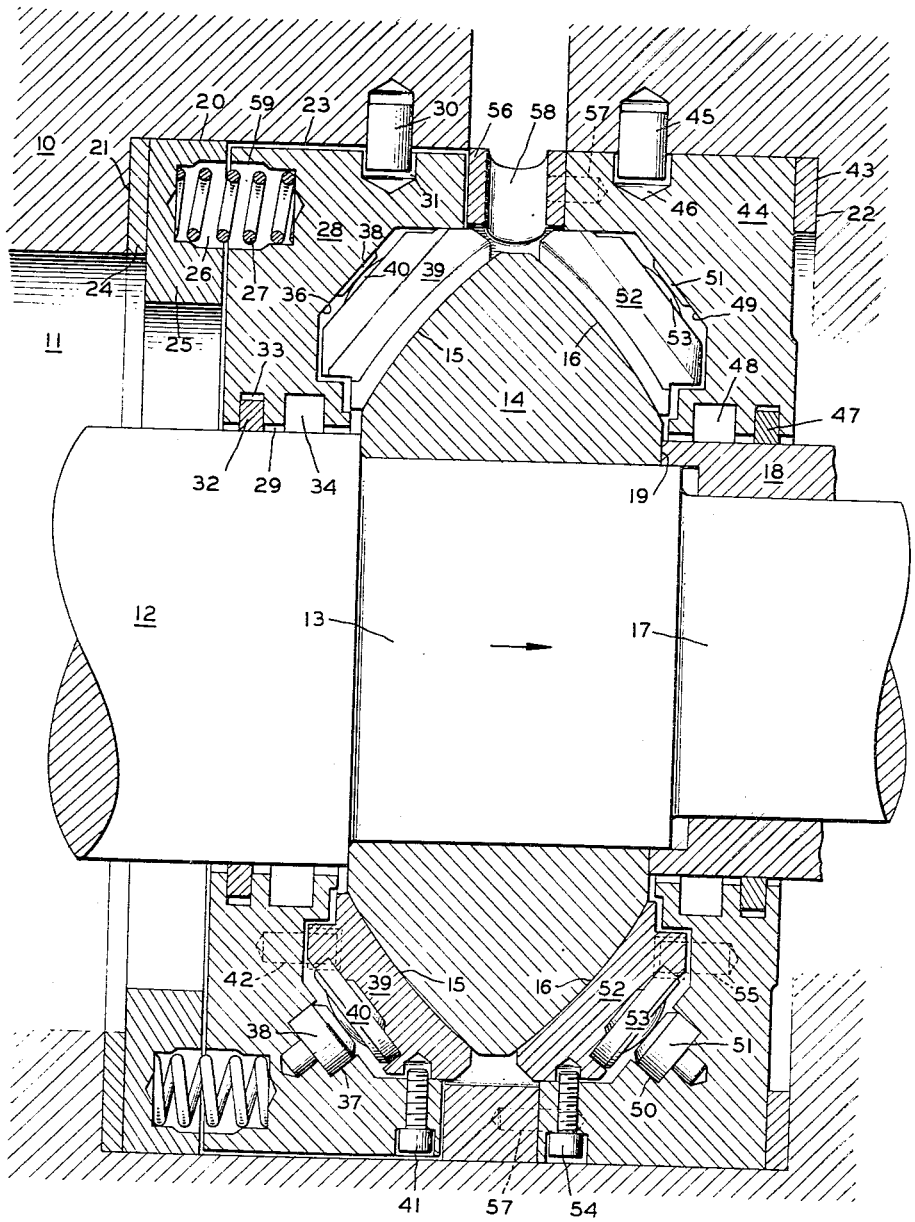
INVENTOR
*Arthur B. Lakey.*
BY
*Cameron, Kerkam & Sutton*
ATTORNEYS United States Patent Office 2,785,022
Patented Mar. 12, 1957

2,785,022

SPHERICAL BEARING

Arthur B. Lakey, Philadelphia, Pa., assignor to Kingsbury Machine Works, Inc., Philadelphia, Pa., a corporation of Delaware Application April 22, 1954, Serial No. 424,910

9 Claims. (Cl. 308—160)

This invention relates to spherical bearings and is particularly useful in connection with such bearings that are employed as horizontal thrust bearings, although it can also be used with any spherical bearing where the advantages set forth hereinafter can be realized.

Heretofore various single and double spherical thrust bearings have been proposed for use with horizontal shafts but these bearings often permit dropping of the shaft at low speeds or do not have sufficient self-aligning qualities to reduce wear and friction to a minimum.

It has been found, and it is the basis of the present invention, that a spherical thrust bearing for a horizontal shaft may be provided with greatly improved self-aligning ability, while at the same time the tendency of the shaft to drop at low speeds can be substantially reduced or even eliminated if one thrust bearing means, comprising the base ring and set of bearing shoes on one side of the shaft thrust collar, is provided with sufficient axial and diametral clearance to take care of misalignments between the stationary housing and the rotating shaft and bearing collar, and at the same time is urged resiliently toward the thrust collar and hence toward the other rigidly supported bearing means.

It is accordingly an object of the present invention to provide a novel spherical thrust bearing for horizontal shafts having improved self-aligning qualities.

Another object is to provide such a thrust bearing which prevents dropping of the shaft at low speeds.

Another object is to provide a double spherical bearing in which one base ring and its set of thrust shoes constitute a floating bearing means that is resiliently urged toward the other bearing means to reduce friction and wear caused by binding due to temporary misalignments of the shaft with respect to the bearing housing.

Other and further objects will appear as the description of the present invention proceeds.

Thrust bearings in accordance with the present invention are capable of various mechanical embodiments one of which is shown in the accompanying drawing and is described hereinafter to illustrate the invention. This illustrative embodiment should not be contrued as defining or limiting the present inventive concept and reference should be had to the appended claims to determine the scope of this invention.

The accompanying drawing illustrates one embodiment of the novel thrust bearing of the present invention with certain of the elements thereof shown in cross section to clarify their relative positions. This embodiment is particularly adapted for use where the principal loads are directed axially along the shaft in one direction, i. e., to the right as shown in the drawing, but it will be understood that if desired the invention can be embodied in other types of bearings.

In the drawing 10 is any suitable housing provided with a bore 11 to receive the shaft 12. Shaft 12 is of reduced diameter at 13 and a thrust bearing collar 14 is mounted on this portion of the shaft, collar 14 being provided with double spherical bearing surfaces 15 and 16. Shaft 12 is further reduced in diameter at 17 and a retaining ring 18 is mounted thereon and contacts collar 14 at its annular surface 19.

Housing 10 is provided with a chamber 20 of larger diameter than bore 11 and having side walls 21 and 22 as well as cylindrical wall 23. An annular filler piece 24 is mounted in chamber 20 adjacent wall 21 and an annular ring 25, also mounted in chamber 20, bears against filler piece 24. Ring 25 is provided with a plurality of bell-shaped pockets 26 spaced equally about its circumference and opening away from filler piece 24. A compression spring 27 is mounted in each of pockets 26 and is of smaller diameter than the bell-shaped mouth of pocket 26. Springs 27 are of sufficient strength to lift the weight of the bearing at low speeds as hereinafter described.

A base ring 28 is mounted in chamber 23 and is provided with an axial bore 29 to receive shaft 12 freely. Base ring 28 is appropriately sized to provide a maximum clearance with ring 25 of the order of 0.01 inch and a similar clearance with surface 23 to permit diametrical movement of base ring 28 when large misalignments of shaft 12 take place. Base ring 28 is prevented from rotation by a plurality of dowels 30 mounted in housing 10 and extending into pockets 31 in base ring 28. Pockets 31 are larger than dowels 30 to provide for the necessary movement of ring 28 in adjusting to shaft misalignment. An oil sealing ring 32 is mounted in annular recess 33 in base ring 28 and bears on shaft 12 and an annular counterbore 34 is also provided in ring 28 adjacent shaft 12 for lubricating purposes. A plurality of bell-mouthed pockets 59 are provided in ring 28 similar to pockets 26 to receive the other ends of springs 27.

A plurality of pockets 36 of desired number, usually six, are formed in ring 28 opposite bearing surface 15. A stepped recess 37 is formed at the bottom of each of pockets 36 and a spherically faced insert 38 is mounted in each of recesses 37. A spherically faced bearing shoe 39 is mounted in each of pockets 36 and is in bearing engagement with surface 15. Each of shoes 39 is provided with a spherically faced insert 40 which bears against inserts 38. Bearing shoes 39 are loosely retained in pockets 36 by set screws 41 and by dowels 42.

It will be seen that the ring 28 and its set of shoes 39 constitute a floating thrust bearing means that is urged resiliently to the right by the springs 27. Because of the spherical conformation of the bearing surfaces, this floating thrust bearing means and the thrust collar 14 tend to move into concentricity with one another.

A second annular filler piece 43 is mounted in chamber 20 and bears against wall 22. A second base ring 44 fits snugly within the cylindrical chamber wall 23 adjacent filler piece 43 and is secured against rotation by dowels 45 set into housing 10 and into pockets 46 in ring 44, said base ring bearing against the filler ring 43. Base ring 44 is provided with an annular oil sealing ring 47 which bears against retaining ring 18 and is also provided with an annular oil receiving counterbore 48.

Base ring 44 is provided with a plurality of pockets 49 similar to pockets 36, and opposite spherical surface 16. Each pocket 49 is provided with a stepped recess 50 in which a spherically faced insert 51 is mounted. A spherically surfaced bearing shoe 52 is mounted in each of pockets 49 and is in bearing engagement with spherical surface 16. Shoes 52 are suitably recessed to receive spherically faced inserts 53 which bear against inserts 51. Shoes 52 are loosely retained in pockets 49 by set screws 54 and dowels 55.

The base ring 44 and its set of shoes 52 thus constitute a second thrust bearing means which is normally restrained against both radial and axial movements. Because of the spherical conformation of the bearing surfaces of the shoes and thrust collar, any thrust of the shaft toward the right is accompanied by a tendency for the shaft to center itself concentrically with said bearing means.

A filler ring 56 is mounted in chamber 23 between base rings 28 and 44 and is so dimensioned that base rings 28 and 44 are in light bearing contact therewith when the bearing is completely assembled. Ring 56 is retained against rotation by dowels 57 which extend into ring 56 and into base ring 44. Ring 56 is provided with a suitable aperture 58 to permit passage of oil from the bearing.

Since springs 27 are of smaller diameter than the bell-mouthed pockets 26 in ring 25 and the bell-mouthed pockets 59 in base ring 28 and since base ring 28 is capable of both axial and diametral movement in chamber 23 it will be seen that base ring 28 may move upon the occurrence of misalignments of shaft 12 to correct for such misalignments without being impeded by springs 27 and without reducing the action of springs 27. Springs 27 exert a constant pressure on base ring 28 urging it toward collar 14 and said collar toward base ring 44. Assuming for example that the shaft 12 carries a turbine rotor at its left end, then at zero or low speeds the only bearing load is that due to the weight of the parts. At absolute rest, static friction may hinder the centering effect, but on the first rotational movement the combined centering action of the floating thrust means, collar, and rigid thrust means causes the shaft to rise immediately to concentricity. At high speeds when the thrust of the shaft to the right is greater, the centering effect of the rigid thrust means alone is sufficient to maintain concentricity. Springs 27 compress to allow for oil film thicknesses even at low speeds, and still more at high speeds when the films are thicker. Compression is limited by the gap between the parts 25 and 28 which determines the total end play. The gap between parts 28 and 56 is designed so that the shoes 39 always bear directly on the collar 14.

It will now be apparent that the present invention in every way provides the several objectives discussed above with additional features and advantages which will now be understood by those skilled in the art.

Changes in or modifications of the above described illustrative embodiment of this invention may now be suggested without departing from the present inventive concept and reference should be had to the appended claims to determine the scope of this invention.

What is claimed is:

1. In a double spherical horizontal thrust bearing, a shaft, a collar on said shaft, opposed spherical bearing surfaces on said collar, opposed thrust bearing means engaging said spherical bearing surfaces, and resilient means urging said opposed bearing means toward each other, one of said thrust bearing means being movable axially and diametrally relative to the bearing surface which it engages.

2. In a thrust bearing, a shaft, a collar on said shaft, opposed spherical bearing surfaces on said collar, opposed thrust bearing means engaging said spherical bearing surfaces, and spring means urging one of said bearing means toward the other of said bearing means, one of said thrust bearing means being movable axially and diametrally relative to the bearing surface which it engages.

3. In a thrust bearing, a housing, a shaft in said housing, a collar on said shaft, opposed spherical bearing surfaces on said collar, a thrust bearing means engaging one of said bearing surfaces and mounted in said housing, a second thrust bearing means engaging the other of said bearing surfaces and being axially and diametrally movable in said housing, and resilient means urging said bearing means toward each other.

4. In a thrust bearing, a housing, a shaft in said housing, a collar on said shaft, opposed spherical bearing surfaces on said collar, a thrust bearing means engaging one of said bearing surfaces and normally restrained against axial and diametral movement in said housing, a second thrust bearing means engaging the other of said bearing surfaces and being axially and diametrally movable in said housing, and springs urging said second bearing means toward said first bearing means.

5. In a thrust bearing, a housing, a shaft in said housing, a collar on said shaft, opposed spherical bearing surfaces on said collar, a thrust bearing means engaging one of said bearing surfaces and restrained against radial and axial movement in said housing, a second thrust bearing means engaging the other of said bearing surfaces and being axially and diametrally movable in said housing, a fixed ring spaced axially from said second thrust bearing means and limiting axial movement thereof, and resilient means interposed between said ring and said second thrust bearing means and urging the latter against said collar.

6. In a spherical thrust bearing, a housing, a shaft in said housing, a collar on said shaft, a spherical bearing surface on said collar, thrust bearing means engaging said spherical bearing surface to resist movement of said shaft in one direction, said thrust bearing means being axially and diametrally movable in said housing, opposed thrust bearing means engaging said collar to resist movement of said shaft in the opposite direction, and resilient means urging said first thrust bearing means toward said spherical bearing surface.

7. A spherical thrust bearing comprising a housing, a shaft passing through said housing and having a thrust collar having opposed spherical bearing surfaces, spherical thrust bearing means in said housing having engagement with one of said bearing surfaces, a second spherical thrust bearing means movable in said housing both radially and axially relative to said first bearing means, and resilient means urging said second bearing means axially to maintain it in engagement with the adjacent bearing surface of said thrust collar while leaving it free for said radial movement in said housing.

8. A bearing as defined in claim 7, said resilient means comprising a plurality of axially disposed springs between said housing and movable bearing means, said springs being spaced around the axis of said shaft.

9. A spherical thrust bearing comprising a housing having a cylindrical cavity, a shaft passing axially through said cavity and having a thrust collar therein, said collar having opposed spherical bearing surfaces, spherical thrust bearing means surrounding said shaft on one side of said collar and having a cylindrical outer surface fitting closely within said cavity whereby said bearing means is restrained against radial movement, a second spherical thrust bearing means surrounding said shaft on the other side of said thrust collar, the radial dimensions of said second bearing means being less than those of said cavity to provide freedom for radial movement of said bearing means in said cavity, and resilient means disposed to urge said second bearing means axially against the adjacent bearing surface of said collar and thereby to maintain the opposed bearing surface of said collar in engagement with said first bearing means.

References Cited in the file of this patent
UNITED STATES PATENTS

| | | |
|---|---|---|
| 2,019,569 | Justesen | Nov. 5, 1935 |
| 2,307,175 | Wainwright | Jan. 5, 1943 |
| 2,569,178 | Lakey | Sept. 25, 1951 |